(12) United States Patent
Gregerson et al.

(10) Patent No.: US 7,554,042 B2
(45) Date of Patent: Jun. 30, 2009

(54) METHODS AND APPARATUS FOR MULTIPLE SUPPORT AND WEIGHT MEASUREMENT POINTS IN A SCANNER SCALE COMBINATION

(75) Inventors: David L. Gregerson, Lawrenceville, GA (US); Paul O. Detwiler, Lawrenceville, GA (US); Harry E. Lockery, Sudbury, MA (US)

(73) Assignee: NCR Corporation, Dayton, OH (US)

( * ) Notice: Subject to any disclaimer, the term of this patent is extended or adjusted under 35 U.S.C. 154(b) by 71 days.

(21) Appl. No.: 11/613,481

(22) Filed: Dec. 20, 2006

(65) Prior Publication Data
US 2008/0149400 A1 Jun. 26, 2008

(51) Int. Cl.
*G01G 21/28* (2006.01)
(52) U.S. Cl. .................. 177/25.15; 177/184; 177/238; 177/245
(58) Field of Classification Search .......... 177/184, 177/245, 25.15, 238
See application file for complete search history.

(56) References Cited

U.S. PATENT DOCUMENTS

| 4,700,656 A | * | 10/1987 | Cone et al. .................. 177/245 |
| 5,139,100 A | * | 8/1992 | Brauneis .................. 177/25.15 |
| 2008/0151328 A1 | * | 6/2008 | Gregerson et al. .......... 358/494 |

* cited by examiner

*Primary Examiner*—Randy W Gibson
(74) *Attorney, Agent, or Firm*—Priest & Goldstein, PLLC; Paul W. Martin

(57) ABSTRACT

Systems and techniques for scanner scale implementation and operation using a plurality of load cells mounted in a planar arrangement. A plurality of load cells is mounted to a scanner base. The load cells are secured within a mounting chassis in such a way that the load bearing elements of the load cells extend through the protective cover. The mounting chassis and load cells may be mounted to the scanner base. A scanner top plate may be secured to the load cells such that the weight of the scanner top plate and any object placed on the scanner top plate is borne by the load bearing elements of the load cells, part of the weight being borne by the load bearing element of each load cell. Upon presentation of an object for weighing, weight signals generated by the load cells are processed to produce a weight reading for the object.

19 Claims, 9 Drawing Sheets

METHODS AND APPARATUS FOR MULTIPLE SUPPORT AND WEIGHT MEASUREMENT POINTS IN A SCANNER SCALE COMBINATION

FIELD OF THE INVENTION

The present invention relates generally to improvements to retail scanner scale systems. More particularly, the invention relates to improved systems and techniques for performing weight measurement using multiple load cells combining to support, and generate weight information for, a weighing plate and an object placed on the weighing plate for weighing in a scanner scale combination.

BACKGROUND OF THE INVENTION

Combined scanner scale systems are very widely employed in retailing. Prior art scanner scale systems typically include scale hardware implemented in the scanner base. This scale hardware is typically implemented in the form of a single point load cell, with a long beam structure being used to support a scanner top plate assembly. This single point load cell and beam structure must support the weight of the top plate assembly itself, in addition to the weight of objects that may be placed on the top plate assembly for weighing.

Such integration of scale hardware imposes significant constraints on design of scanner scale systems. The scanner base must provide physical space for the scale components, and the enclosure and mechanical elements of the scanner base must be constructed so as to support the top plate assembly and any loads that may be placed on the top plate assembly. The physical space needed for the scale components imposes size requirements on a scanner in order to accommodate the scale components and also provide room for the optical paths required to generate scan beams and to collect reflected light that is directed back into the scanner and to direct and focus this light onto a detector for processing. The pieces comprising the scale assembly are of a relatively large size, and the size and nature of the pieces, as well as the need to integrate the pieces into the scanner, leads to complexity in assembly and service procedures. Moreover, prior art implementations suffer from several drawbacks that affect their operation. For example, they are subject to linearity problems, and to calibration problems that may occur when the scanner scale system is disturbed. They are also subject to relatively long settling times due to the large size of the structural pieces comprising the scale assembly.

SUMMARY OF THE INVENTION

Among its several aspects, the present invention addresses such difficulties by providing for a plurality of small load cells mounted in a base of a scanner scale combination, or scanner base. The load cells combine to support a scanner top plate assembly and any objects placed on the top plate for weighing. The load cells are suitably disposed so that the weight of the top plate assembly will be distributed across the load cells, which are in turn supported by structural elements, such as support pillars, in the scanner base. Because the load cells share the weight of the top plate assembly, each load cell can be relatively small. Each load cell suitably includes a compressible load mount. The load mounts support the weight of the top plate and any object placed on the top plate, and produce signals that are processed to provide a weight reading for the object.

The support pillars, load cells, and flexible load mounts are suitably configured and arranged so that the tops of the load mounts fall in a single plane. The load cells may suitably be mounted beneath a mounting chassis that provides grounding between the load cells. The compressible load mounts suitably protrude upward through openings in the mounting chassis in such a way that the load mounts can support the weight of an object placed on the load cells. Suitably, the weight of the object is transmitted through a top plate or other element placed on or secured to the load mounts. The openings in the mounting chassis are relatively closely fitted to the load mounts, in order to minimize the size of openings through which debris might enter the scanner base.

A more complete understanding of the present invention, as well as further features and advantages of the invention, will be apparent from the following Detailed Description and the accompanying drawings.

DETAILED DESCRIPTION

Figure 1A:
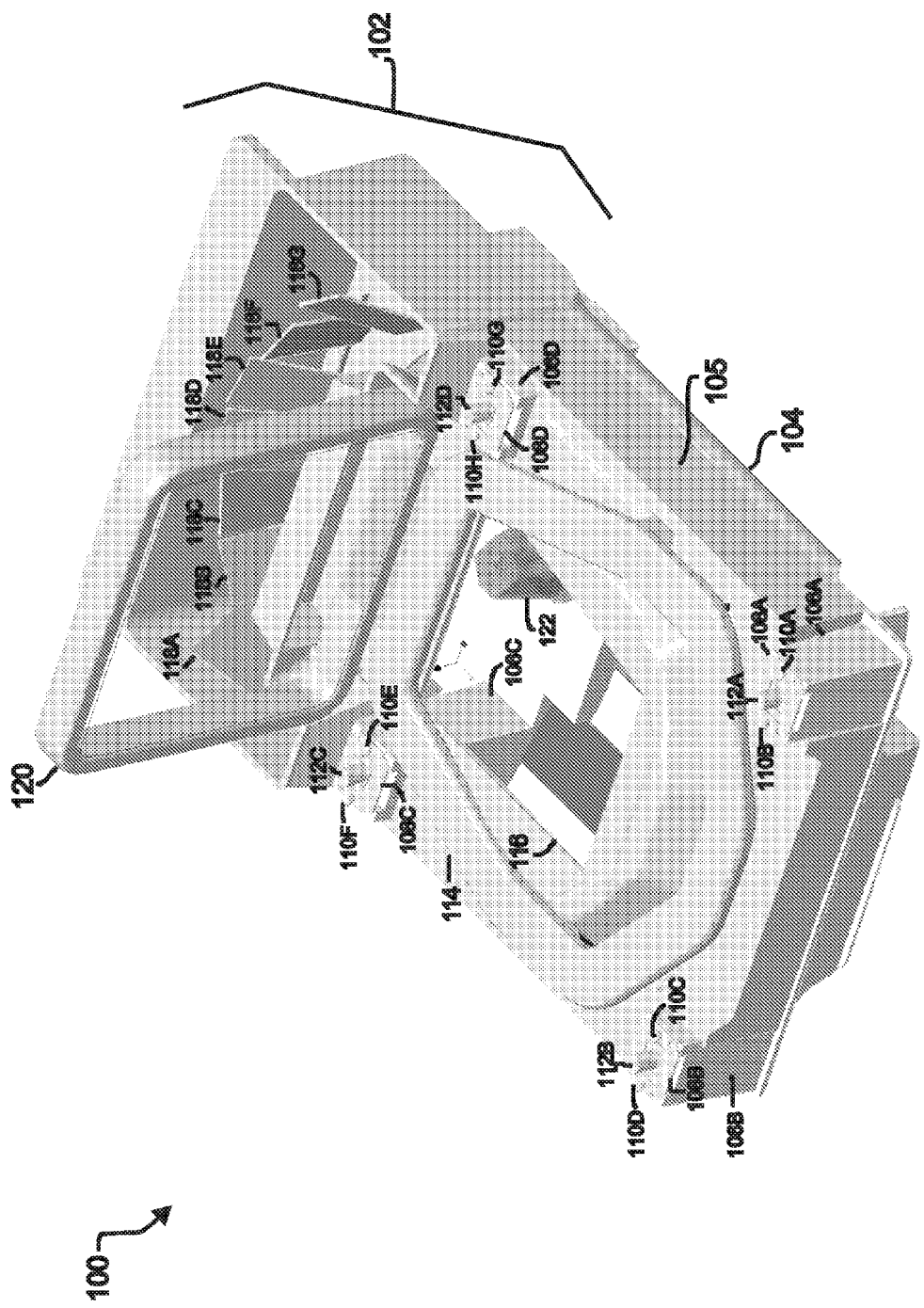
FIGS. 1A and 1B illustrate views of a scanner base according to an aspect of the present invention.

FIG. 1A illustrates a base 100 for a scanner scale combination according to an aspect of the present invention. The base 100 includes a housing assembly 102, which is shown open for ease of viewing. The housing assembly includes a housing base 104 and an enclosure 105. The housing assembly 102 includes four support pillars 106A-106D. The housing base 104 is shown here as cast so that the support pillars 106A-106D are integrally formed with the housing base 104, but the support pillars 106A-106D may, if desired, be separately formed and mounted to the housing base 104. The support pillars 106A-106D and the housing assembly 102 are suitably shaped, sized, and disposed so that the housing base 104 is U-shaped, allowing for the placement of theft prevention hoops and antennas within its inner dimensions. The U-shape of the housing base 102 prevents the formation of current loops attenuating the fields produced by electronic article surveillance devices.

A plurality of load cells 108A-108D are mounted on the scanner base 100 in such a way that the weight of an object placed for weighing on a scanner scale combination of which the base 100 is a part will be distributed across the load cells 108A-108D. Typically, the object will rest on a weighing plate, which may suitably be a scanner top plate and may be either loosely placed on, or securely mounted to, the load cells 108A-108D, depending on the particular design choices for a scanner scale assembly using the scanner base 100.

In the present exemplary embodiment, four load cells 108A-108D are mounted on the support pillars 106A-106D, respectively. It will be recognized, however, that a different number of load cells may be used, and the housing assembly 102 may be constructed in such a way that support pillars are not used, with the load cells being disposed in any desired fashion that will allow the weight of a loaded or unloaded weighing plate to be properly distributed across the load cells. However, the use of four load cells, each on one support pillar, provides an arrangement having considerable support strength and allows equal or approximately equal weight distribution across the load cells. Additional details of the load cells are discussed in Lockery application Ser. No. 11/613,491, filed on even date with the present invention, which is assigned to the common assignee of the present invention and incorporated herein by reference in its entirety.

Figure 1B:
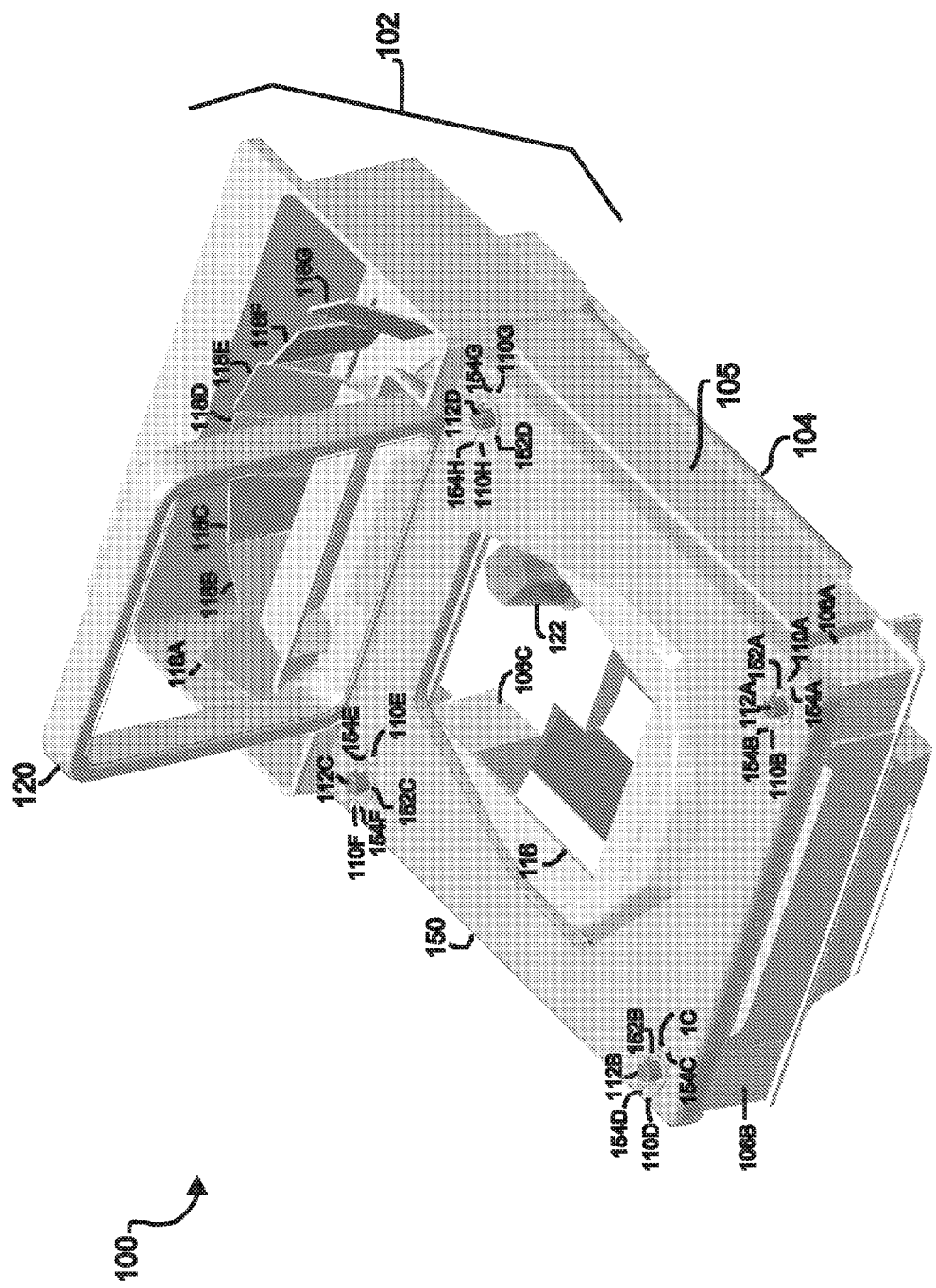
Figure 2:
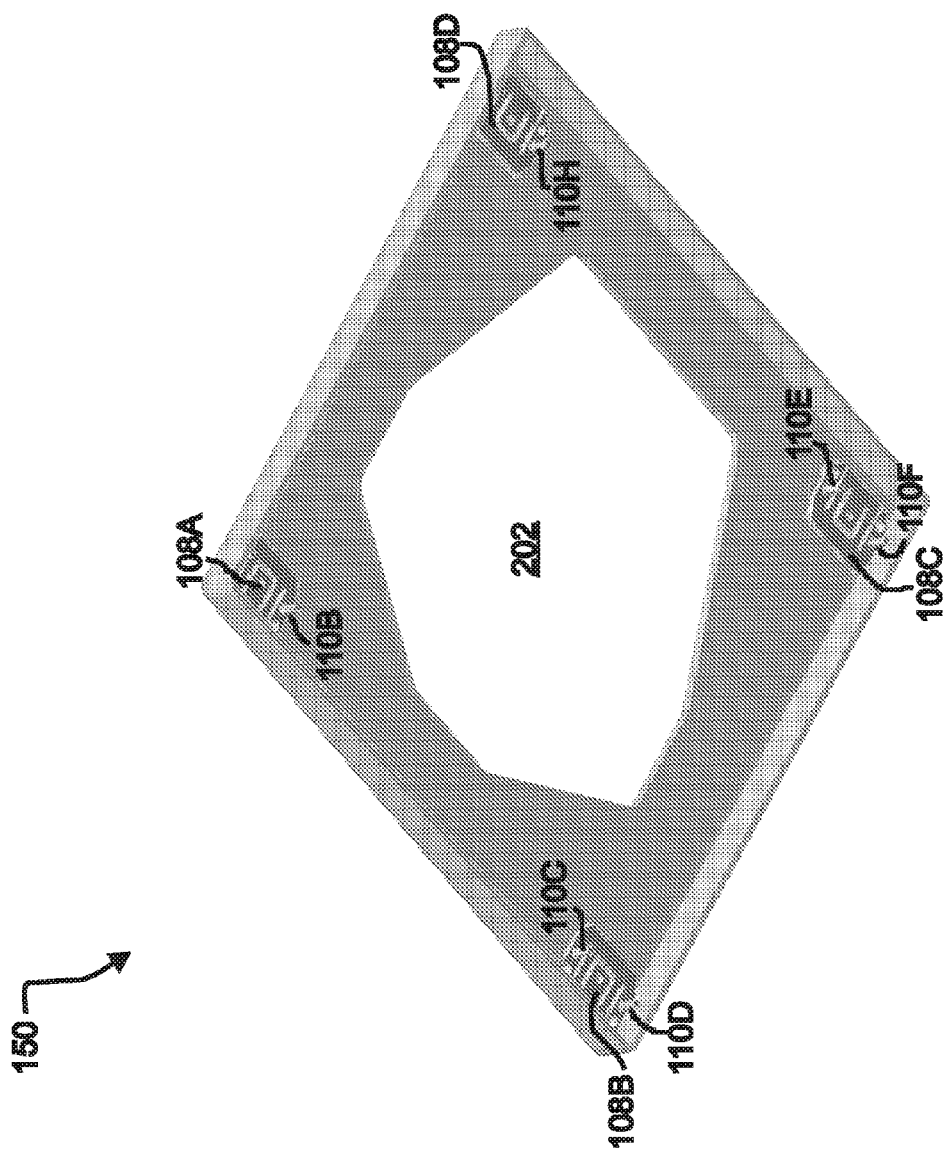
FIG. 2 illustrates a load cell mounting chassis according to an aspect of the present invention.

In the present illustration, the load cell 108A is secured to the support pillar 106A by pins 110A and 110B, the load cell 108A is secured to the support pillar 106B by pins 110C and 110D, the load cell 108C is secured to the support pillar 106C by pins 110E and 110F, and the load cell 108D is secured to the support pillar 106D by pins 110G and 110H. The pins 110A-110H may suitably be secured to a mounting chassis in which the load cells 108A-108D are placed, and fit into suitable receptacles in the load cells 108A-108D when the mounting chassis and the load cells 108A-108D are mounted to the base 100. The mounting chassis is not shown here, but is illustrated in FIGS. 1B and 2, and discussed below.

The load cells 108A-108D include load mounts 112A-112D, respectively. The load mounts 112A-112D are suitably elastometric. Each of the load mounts undergoes compression when a force is applied to it in a vertical direction. In typical operation of the base 100, such vertical forces will be exerted by the weight of a weighing plate, such as a scanner top plate, that may be is mounted to the load mounts 112A-112D, combined with any objects that have been placed on the weigh plate for weighing. Depending on the particular design choices for a scanner scale assembly in which the scanner base 100 is used, the scanner base 100 may be designed so that a scanner top plate may be loosely coupled or rigidly mounted to the load mounts 112A-112D.

Each of the load cells 108A-108D produces a weight signal that is suitably proportional to the deflection of the load cell and the compression experienced by its load mount, and can be processed to determine the force that is being exerted on the load cell and load mount. The support pillars 106A-106D, the load cells 108A-108D, and the load mounts 112A-112D, are suitably sized and positioned so that the weight of a weigh plate that may be secured to the base 100, as well as the weight of any object that may be placed on the plate, is distributed across the load mounts 112A-112D. The support pillars, load cells, and load mounts are preferably sized and positioned so that the tops of the load mounts 112A-112D fall in a single plane.

The base 100 includes an assembly 114. The base 100 also includes an aperture 116, which serves as a horizontal scan window once elements are added to assemble a scanner scale combination. Various additional elements can be seen, such as an array of fixed mirrors 118A-118G, an assembly 120, and a rotating polygonal spinner 122. The various optical elements illustrated here are standard and exemplary, and the present invention may be practiced in a scanner scale combination having the illustrated configuration or any other desired configuration. In addition, if desired, a scale that does not include a scanner may be assembled according to the teachings of the present invention.

FIG. 1B illustrates another view of the base 100, showing a mounting chassis 150 affixed to the base 100. The housing assembly 102, housing base 104 and enclosure 105 are visible here. Also visible are the aperture 116, the fixed mirrors 118A-118G, the assembly 120, and the rotating polygonal spinner 122, as well as the support pillars 106A, 106B and 106C. The support pillar 106D is obscured by the mounting chassis 150. The load mounts 112A-112D can be seen protruding through holes 152A-152D, respectively, in the mounting chassis 150. The load cells 108A-108D are suitably secured to the mounting chassis 150, which is then placed on and secured to the base 100 by securing the load cells 108A-108D to the support pillars 106A-106D, respectively. The load mounts 112A-112D protrude through the holes 152A-152D after the mounting chassis 150 has been secured in place. However, because the load mounts 112A-112D are elastic, they tend to recede through the holes 152A-152D as the weight placed on them increases. Suitably, the load mounts 112A-112D, the scanner base 100, and the mounting chassis 150 are designed so that if a weight exceeding the weight limits of the load mounts 112A-112D is placed on the load mounts 112A-112D, the load mounts 112A-112D will recede through the holes 152A-152D to such an extent that the excess weight will be supported by the mounting chassis 150 as it rests on the support pillars 106A-106D. An accurate weight reading will not be achieved under such circumstances, but the support provided by the mounting chassis 150 will prevent damage resulting from overloading of the load cells 112A-112D.

The holes 152A-152D are large enough to prevent friction or other forces associated with the mounting chassis 150 from influencing weight readings produced by the load cells 108A-108D. However, the holes 152A-152D are small enough so as to fit relatively closely to the load mounts 112A-112D, so that the presence of the load mounts within the holes provides a relatively effective blockage that prevents debris from entering the base 100. The mounting chassis 150 includes holes such as the holes 154A and 154B, to accommodate pins used to secure the load cells 108A-108D to the support pillars 106A-106D.

FIG. 2 illustrates an underside view of the mounting chassis 150, from the perspective of a viewer looking up at the support chassis 202 from below. The support chassis 150 includes an aperture 202. The load cells 108A-108D can be seen secured to the support chassis 150.

The load mounts 112A-112D of FIGS. 1A and 1B are preferably relatively soft, with this softness allowing them to undergo the compression needed to give a weight reading. Because the load mounts 112A-112D are soft, the forces they experiencing when the top plate 200 is mounted to the base 100 and weighing operations proceed, the load mounts 112A-112D can be deflected from their nominal positions, leading the load mounts 112A-112D to experience side loads and therefore undergo lateral deflection. The presence of such side loads and the consequent lateral deflections cause inaccurate readings. The deflection also causes the loading on the load mounts to be improperly distributed, also creating a tendency toward inaccuracy.

Figure 3A:
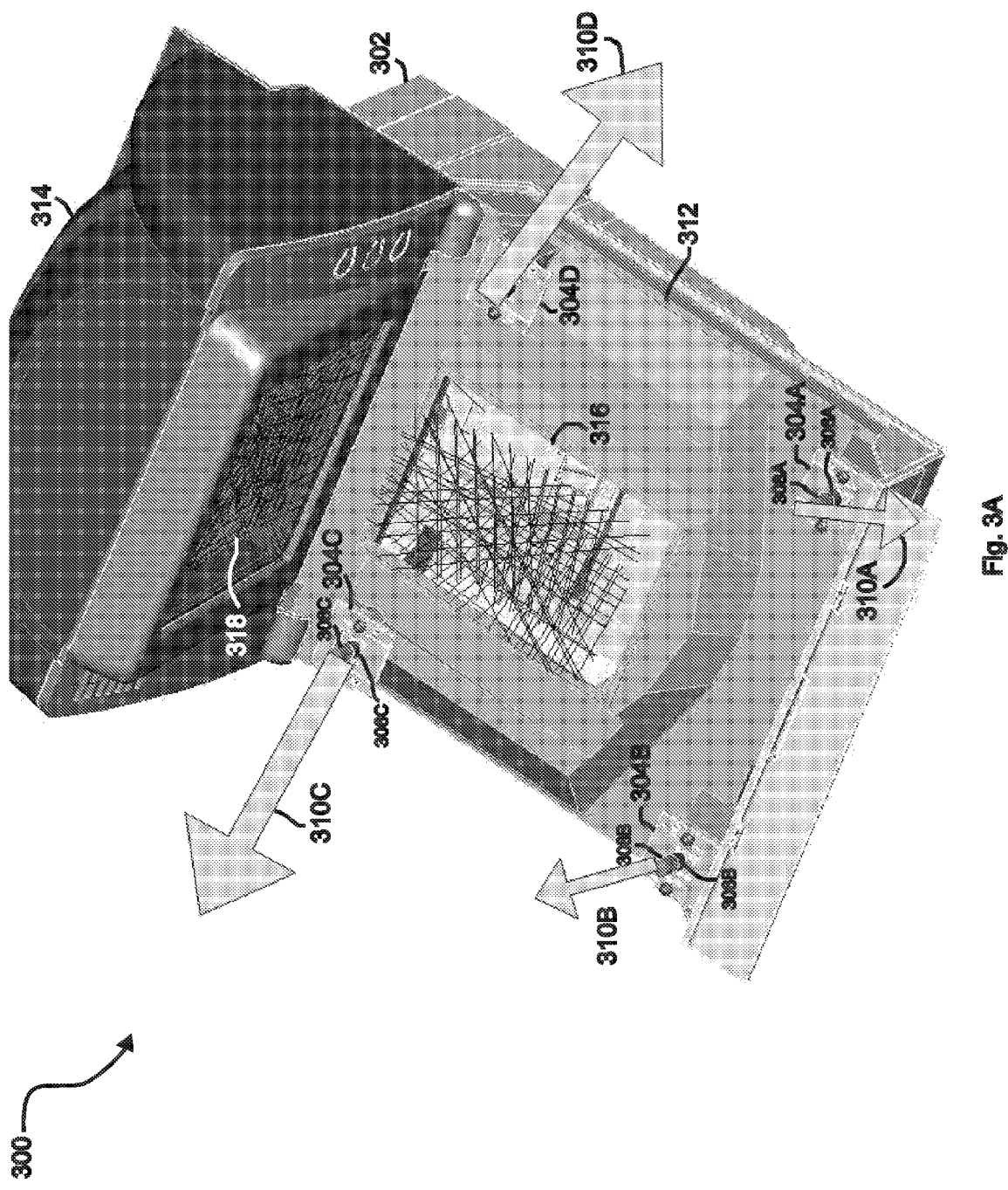
FIGS. 3A-3D illustrate a scanner base according to an aspect of the present invention.
Figure 3B:
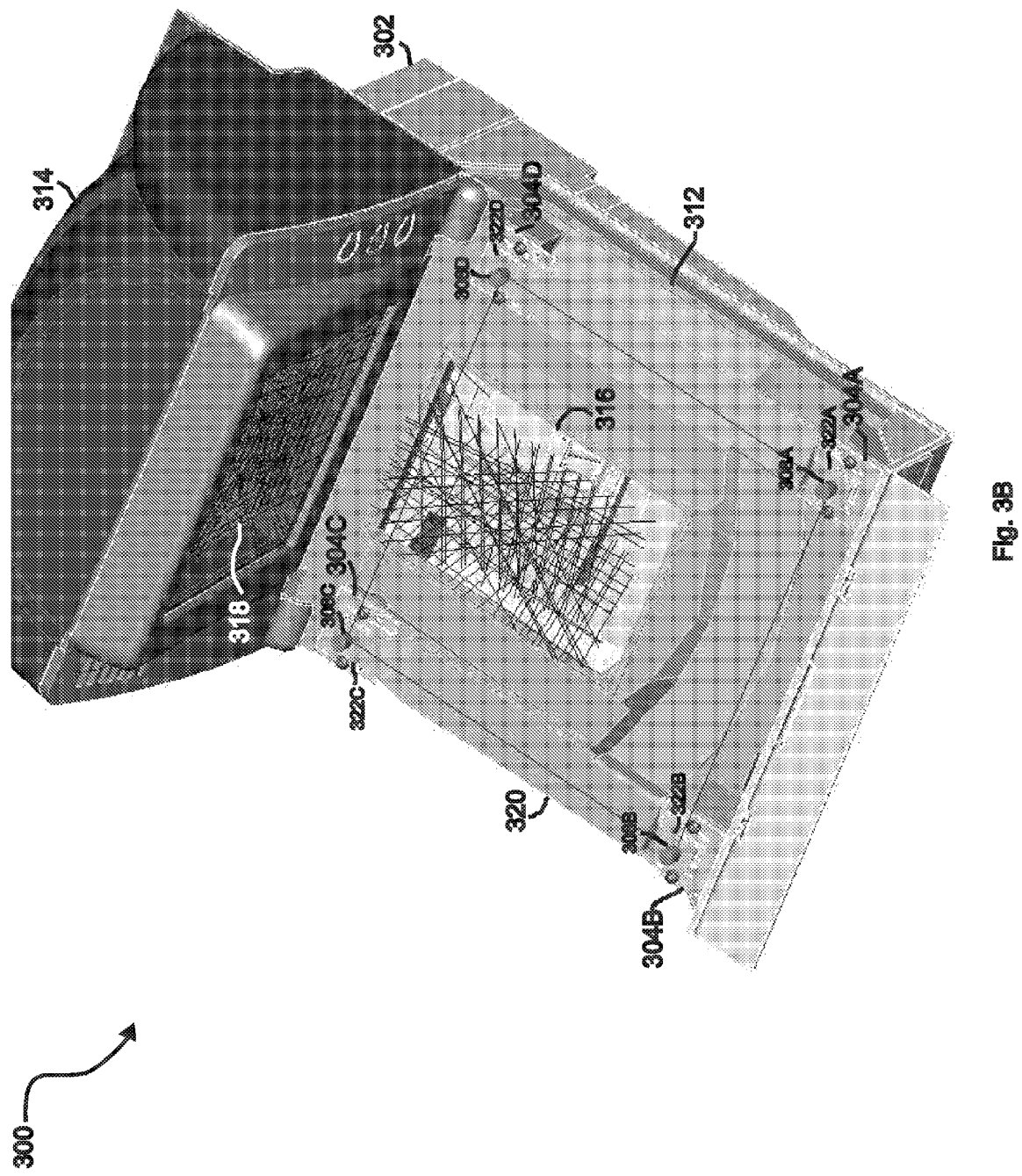
Figure 3C:
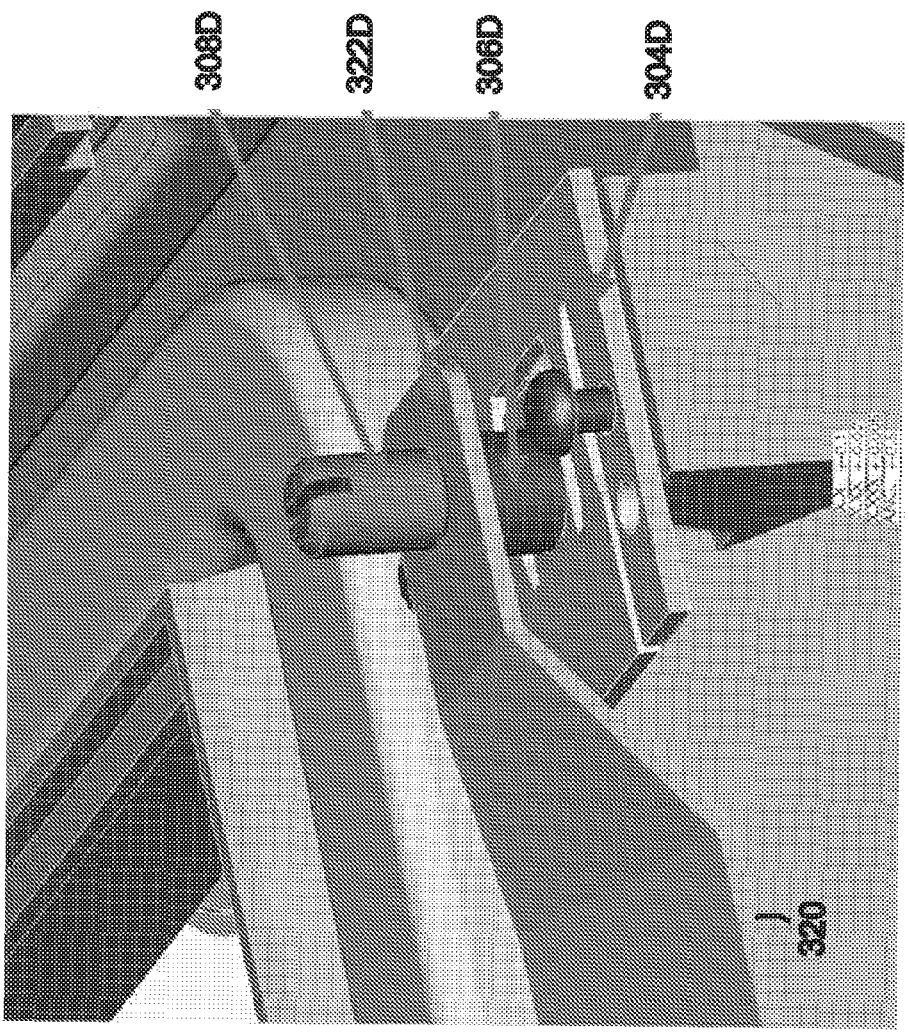

FIG. 3A illustrates a base 300 for a scanner scale combination according to an aspect of the present invention, showing a housing 302, and load cells 304A-304D. Load mounts 306A-306D and scale pins 308A-308C are visible. The load cell 304D also includes a load cell 304D, which is not visible here, but which is seen in FIG. 3C, and which includes a load mount 306D and a scale pin 308D. The load mount 306D can be seen in FIG. 3C, and the scale pin 306D can be seen in FIGS. 3B and 3C.

Also visible are vectors 310A-310D, symbolizing side loads that may develop during use of the scanner base 300. Further visible are a cover 312, a vertical covering 314, and horizontal and vertical windows 316 and 318.

In order to prevent the displacement of load mounts and the creation of side loads, the load mounts used by a scanner base such as the base 100 or the base 300 are suitably secured by a frame that holds the load mounts in their nominal position. FIG. 3B illustrates another view of the scanner base 300, also showing the housing 302, load cells 304A-304D, mounting pins 308A-308D, cover 312, vertical housing 314, and horizontal and vertical windows 316 and 318. The load mounts 306A-306D are obscured. FIG. 3B also illustrates a frame 320, having mounting points 322A-322D. The frame 320 is secured to the load mounts 306A-306D by the scale pins 308A-308D at the mounting points 322A-322D. The frame 320 is placed, and the mounting points 322A-322D are secured to the load mounts 306A-306D, in such a way that the frame 320 prevents horizontal displacement of the load mounts 306A-306D. In addition, the placement and securing of the frame 320 is accomplished in such a way that the frame 320 does not present resistance to vertical compression of the load mounts. Additional details of a frame such as the frame 320 and its use in a base for a scanner scale combination such as the base 300 are discussed in Gregerson et al., application Ser. No. 11/613,491, filed on even date with the present invention and assigned to the common assignee of the present invention and incorporated herein by reference.

FIG. 3C illustrates a close up view of the scanner base 300, showing the load cell 304D, with the load mount 306D and the mounting pin 308D visible. Also visible is the attachment point 322D of the frame 320, as well as a portion of the cover 312. The attachment point 322D, and similar attachment points 322A-322C, maintain the load mounts 306A-306D in their nominal positions.

The scale pins 308A-308D are shown here as having flat top surfaces. If such pins are used, it is desirable to adapt a top plate used with a base such as the scanner base 300 so that the contact areas between the top plate and the pins 308A-308D are not planar. Suitably, a top plate may be adapted for use with a scanner base such as the scanner base 300 of FIGS. 3A-3C, using pins with flat top surfaces, such as the pins 308A-308D, by forming the top plate so that the rest points on which the top plate rests on the pins 308A-308D have convex dome shaped surfaces. If loads are not centered on a top plate when weighing is being performed, the top plate will tend to change the angles on which it rests on the scale pins 308A-308D. Such changes in angle have the potential to create side loads on the load mounts 306A-306D, and reduce weighing accuracy. If the contacts between the rest points on a top plate and the load pins 308A-308D is not planar, such side loads will be reduced, improving weighing accuracy.

Figure 3D:
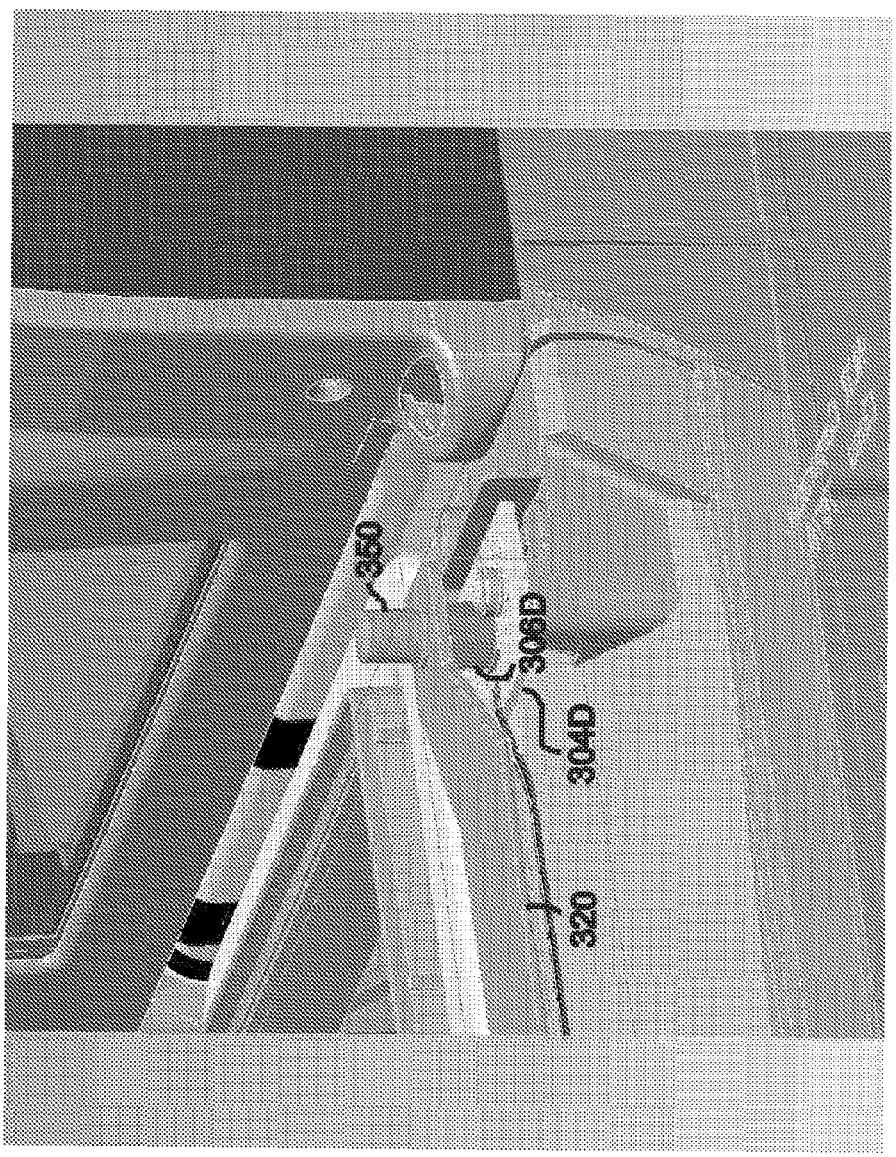

In addition to using flat surface scale pins such as the scale pins 306A-306D, scale pins having a domed top surface may be used with a top plate having flat or convex rest points. FIG. 3D illustrates a partial view of the base 300, showing the load cell 304A, the load mount 308A, and a portion of the frame 320. FIG. 3D also illustrates a scale pin 350, having a domed top surface. Similar pins may be used with the load mounts 306A-306C. The use of scale pins having domed top surfaces, such as the scale pin 350, provides for a nonplanar contact between each scale pin and a corresponding rest point of a scanner top plate, whether the rest point is flat, convex, or some other shape. As noted above, such nonplanar contacts between scale pins and rest points reduces side loads caused by noncentered loading of a top plate during weighing, and thus improves weighing accuracy.

Figure 4:
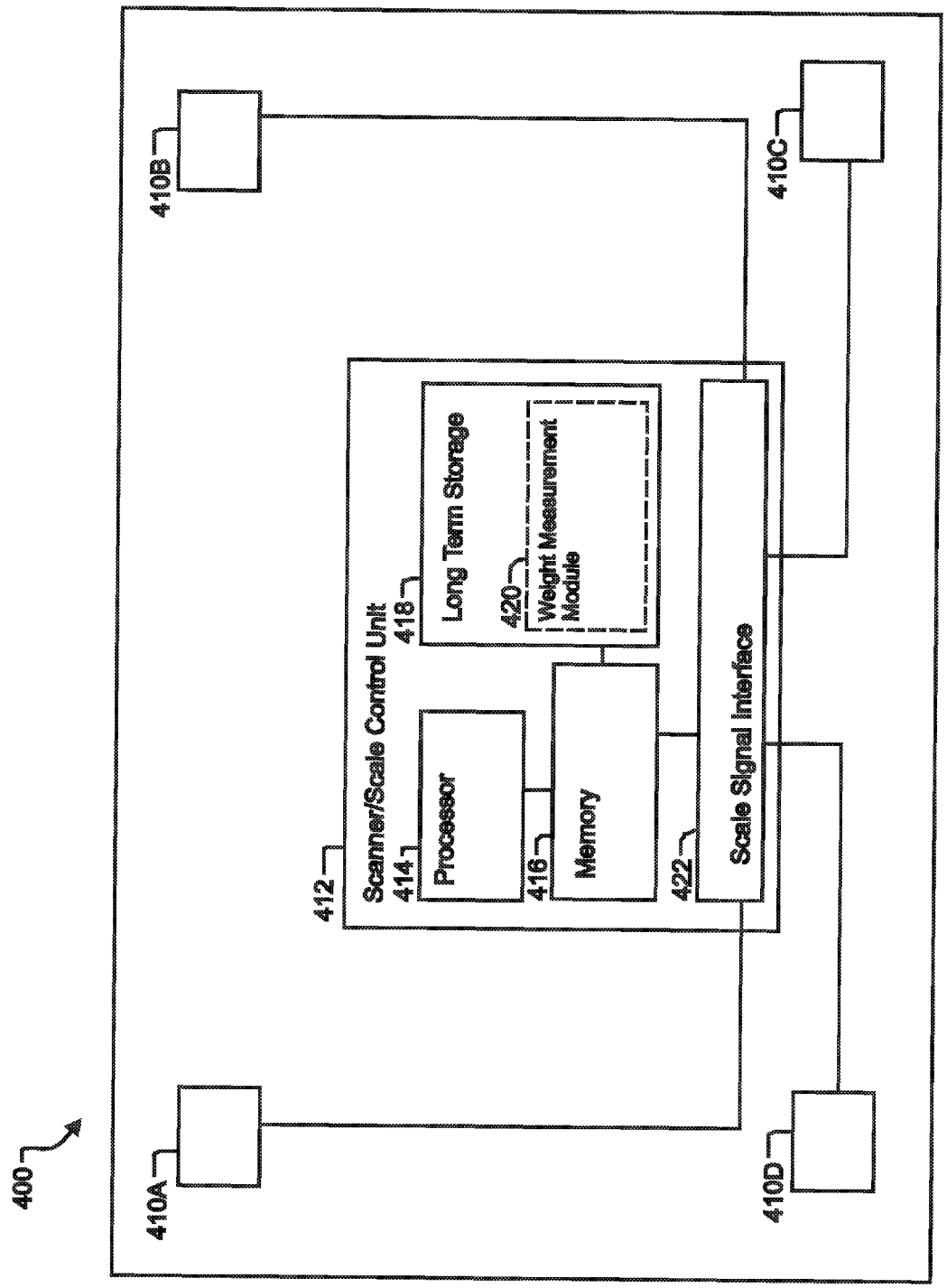
FIG. 4 illustrates a block diagram of electronic components employed in a scanner scale combination according to an aspect of the present invention.

FIG. 4 is a block diagram 400 of various electronic components suitably used in a base for a scanner scale combination such as the base 100. Load cells 410A-410D are shown, along with a scanner/scale control unit 412. The scanner/scale control unit 412 includes a processor 404, high speed memory 416, and long term storage 418, suitably hosting a weight measurement module 420. The scanner/scale control unit 402 also includes a scale signal interface 422. The scale signal interface 422 suitably receives and processes individual weight signals from the load cells 402A-402D and transfers a single weight value to the memory 416, where the weight value is available to the processor 414. Alternatively, the scale signal interface 422 may receive and process each weight signal individually and deliver each weight signal to the memory 416. The processor 406 may then process the individual weight signals to generate a weight value.

Figure 5:
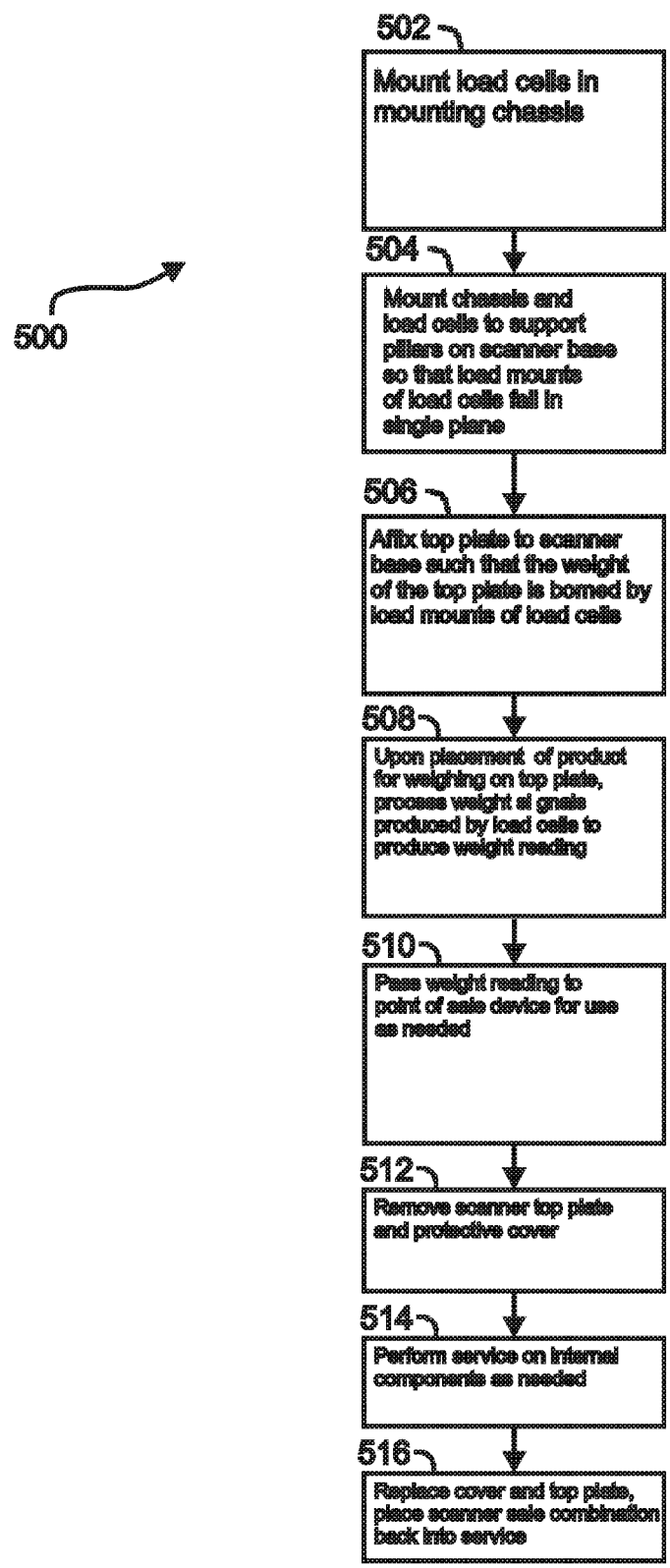
FIG. 5 illustrates a process of scanner scale combination assembly and use according to an aspect of the present invention.

FIG. 5 illustrates a process 500 of assembly and use of a scanner scale combination according to an aspect of the present invention.

At step 502, a plurality of load cells are secured within a mounting chassis to be mounted to a scanner scale combination base. The mounting chassis includes holes allowing the load mounts to extend through and above the protective cover, so that a scanner top plate can rest on the load mounts with its weight being wholly supported by the load mounts, without any of the weight of the top plate being borne by the protective cover during normal use. However, the load cells are suitably placed within the mounting chassis so that load bearing elements of the load cells recede within the holes of the mounting chassis when a load is applied to the load cells, and when an excess load is applied to the load cells, the portion of the load exceeding the limits of the load cells is borne by the mounting chassis. The holes are suitably closely fitted to the load mounts so as to prevent debris from reaching the load cells.

At step 504, the mounting chassis and the load cells are mounted to corresponding support pillars on a base of a scanner scale combination. Each of the load cells includes a load mount for supporting a rest point of a scanner top plate, and for providing a weight signal dependent on the weight borne by the load mount. The scanner scale combination base, support pillars, load cells and load mounts are suitably configured and disposed so that the tops of the load mounts are all in a single plane, and such that the support pillars and load cells are disposed at or near points along a perimeter of the scanner scale combination.

At step 506, a scanner top plate is affixed to the scanner scale combination base, with the weight of the scanner top plate and any item that may be placed on the scanner top plate for weighing resting on the load mounts. At step 508, upon placing of a product on the scanner top plate for weighing, weight signals generated by the load mounts are processed to generate a weight reading for the product. At step 510, the weight reading for the product is passed to a point of sale device for use as required, for example, to determine weight and pricing of a product to be entered into a sales transaction.

Because the load cells may be disposed at points about the perimeter of the scanner scale combination, the load cells do not significantly interfere with access to the interior of the scanner scale combination. Such access may be required for service, and steps 512 through 516 may be performed whenever service is required.

At step 512, whenever access is required to internal components of the scanner scale combination, such as for servicing, the scanner top plate and the mounting chassis are removed. At step 514, the internal components of the scanner scale combination are serviced as required. At step 516, the mounting chassis and the scanner top plate are replaced and the scanner scale combination is put back into service.

While the present invention is disclosed in the context of a presently preferred embodiment, it will be recognized that a wide variety of implementations may be employed by persons of ordinary skill in the art consistent with the above discussion and the claims which follow below.

We claim:

1. A base for a scanner scale combination, comprising:
 a housing base containing optical components for scanning; and
 a plurality of load cells mounted on top of the housing base and at a level above the optical components, the load cells mounted in such a way that each load bearing element of a load cell will bear a portion of the weight of a scanner top plate that may be secured to the base.

2. The base of claim 1, wherein the housing base includes a plurality of support pillars for supporting a scanner top plate and wherein each of the load cells is mounted to one of the support pillars.

3. The base of claim 2, wherein the load bearing elements of the load cell are in a single plane.

4. The base of claim 3, wherein the load bearing element of each of the load cells is a load mount and wherein the base, pillars, load cells and load mounts are configured and disposed so that the tops of the load mounts are in a single plane.

5. The base of claim 4, wherein each of the load mounts is an elastometric load mount.

6. The base of claim 5, wherein each of the load mounts has secured to it a support for a scanner top plate, each of the supports being configured so as to provide for a nonplanar contact between the support and the scanner top plate.

7. The base of claim 6, wherein each of the supports is a scale pin having a generally dome shaped top.

8. The base of claim 5, further comprising a mounting chassis secured to the housing base in such a way that the load mounts extend through the mounting chassis.

9. The base of claim 8, wherein the mounting chassis provides grounding between the load cells.

10. The base of claim 8, wherein the mounting chassis includes apertures fitting relatively closely to the load mounts.

11. The base of claim 10, wherein the housing base is generally U-shaped and space is available within the housing base for the placement of antitheft electronic components.

12. The base of claim 10, wherein the load cells and the mounting chassis are placed such that the load mounts will recede within the apertures of the mounting chassis as a load is placed on the load cells, the placement of the mounting chassis and the load cells being such that if an load exceeding the limits of the load cells is placed on the load cells, the load cells will recede within the apertures to such an extent that the portion of the load exceeding the limits of the load cells will be borne by the mounting chassis.

13. The base of claim 1, wherein the load cells are relatively small and exhibit a relatively short settling time.

14. A method of scanner scale combination assembly and operation, comprising the steps of;
 mounting a plurality of load cells on top of a scanner base containing optical components for scanning, the plurality of load cells being at a level above the optical components;
 securing a scanner top plate to the scanner base such that a portion of the weight of the scanner top plate is borne by a load bearing elements of each of the load cells; and
 upon placement of an object on the top plate for weighing, receiving weight signals generated by the load cells and processing the weight signals to generate a weight reading for the object.

15. The method of claim 14, wherein the scanner top plate may be rigidly mounted or loosely coupled to the load cells.

16. The method of claim 15, wherein the step of mounting the plurality of load cells to the scanner base includes securing the load cells in a mounting chassis and securing the mounting chassis to the scanner base in such a way that the load bearing elements of the load cells extend through the mounting chassis.

17. The method of claim 16, wherein the step of mounting the load cells on the scanner base includes mounting a plurality of support pillars on the scanner base and mounting one load cell to each support pillar.

18. The method of claim 17, wherein mounting the load cells to the scanner base includes mounting the load cells such that the load bearing elements of the load cells are in a single plane.

19. The method of claim 18, wherein securing the load cells and mounting chassis to the scanner base includes placing the load cells and mounting chassis in such a way that the load bearing elements of the load cells recede within apertures within the mounting chassis if a load is applied to the load cells, and if an excess load is applied to the load cells, the recession is such that any portion of the load exceeding the limits of the load cells is borne by the mounting chassis.

* * * * *